United States Patent
Kistler et al.

(10) Patent No.: US 7,079,341 B2
(45) Date of Patent: Jul. 18, 2006

(54) MULTIPLE DISK, VARIABLE RPM DATA STORAGE SYSTEM FOR REDUCING POWER CONSUMPTION

(75) Inventors: Michael David Kistler, Pflugerville, TX (US); Ramakrishnan Rajamony, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 177 days.

(21) Appl. No.: 10/798,935

(22) Filed: Mar. 11, 2004

(65) Prior Publication Data

US 2005/0204097 A1 Sep. 15, 2005

(51) Int. Cl.
*G11B 5/09* (2006.01)
*G06F 12/00* (2006.01)

(52) U.S. Cl. .......................... 360/46; 711/158; 711/162
(58) Field of Classification Search ...................... None
See application file for complete search history.

(56) References Cited

U.S. PATENT DOCUMENTS

| | | | | |
|---|---|---|---|---|
| 5,796,540 | A * | 8/1998 | Jones et al. ............... | 360/73.02 |
| 5,881,311 | A * | 3/1999 | Woods ........................... | 710/4 |
| 6,104,566 | A | 8/2000 | Stephenson | |
| 2003/0163756 | A1* | 8/2003 | George .......................... | 714/5 |

(Continued)

OTHER PUBLICATIONS

U.S. Appl. No. 10/313,275, filed Dec. 5, 2002, Kistler et al.

(Continued)

Primary Examiner—Wayne Young
Assistant Examiner—Glenda P. Rodriguez
(74) Attorney, Agent, or Firm—Casimer K. Salys; Dillon & Yudell LLP

(57) ABSTRACT

A data storage system includes a set of disks where each disk is operable in a plurality of discrete angular velocity levels. A disk controller controls the angular velocity of each active disk. The controller replicates a first portion of data on a plurality of the disks stores a second class of data in the set of disks without replication. The disk controller routes data requests to one of the active disks based, at least in part, on the current loading of the active disks to maintain balanced loading on the active disks. The disk controller alters the angular velocity of at least one of the active disks upon detecting that the latency of one or more of the data requests differs from a specified threshold. In this manner, the disk controller maintains the angular velocity of the active disks at approximately the same minimum angular velocity needed to attain acceptable performance. The disk controller may replicate the first portion of data on each of the disks in the set of disks. The disk controller may balance the loading on the active disks by routing an incoming request to the active disk with the least loading. The disk controller may maintain each of the active disks at approximately the same angular velocity by preventing the angular velocity of any active disk from differing from the angular velocity of any other active disk by more than one discrete level. The disk controller may recognize two or more levels of request priorities. In this embodiment, the disk controller routes requests of a first priority to an active disk in a first subset of active disks based, at least in part, on the current loading of the disks in the first subset and route requests of a second priority to an active disk in a second subset of active disks based, at least in part, on the current loading of the disks in the second subset.

17 Claims, 4 Drawing Sheets

U.S. PATENT DOCUMENTS

2004/0111558 A1* 6/2004 Kistler et al. ............... 711/114
2005/0138284 A1* 6/2005 Cohn et al. ................. 711/114

OTHER PUBLICATIONS

E.N. Elnozahy, M. Kistler, R. Rajamony; Energy Efficient Server Clusters; Proceedings of the Second International Workshop on Power Aware Computing Systems, pp. 179-196, Feb. 2, 2002.

S. Gurumurthi, A. Sivasubramaniam, M. Kandemir, H. Franke; DRPM: Dynamic Speed Control for Power Management in Server Class Disks; Proceedings of the International Symposium on Computer Architecture (ISCA), pp. 169-179, Jun. 2003.

* cited by examiner

| DISK | STATUS 181 | CAPACITY 182 | DATA ALLOC 183 | | PARITY ALLOC 186 | | RPM 189 | LOAD 190 |
|---|---|---|---|---|---|---|---|---|
| | | | TOTAL 184 | FREE 185 | TOTAL 187 | FREE 188 | | |
| 1 | ACTIVE | 100 | | | | | 3500 | |
| 2 | ACTIVE | 100 | | | | | 3500 | |
| 3 | SLEEP | 100 | | | | | | |
| 4 | ACTIVE | 100 | | | | | 4000 | |
| 5 | SLEEP | 100 | | | | | | |

MULTIPLE DISK, VARIABLE RPM DATA STORAGE SYSTEM FOR REDUCING POWER CONSUMPTION

RELATED APPLICATION

The subject matter of the present application is related to the subject matter disclosed U.S. patent application of Kistler entitled A Multiple Disk Data Storage System for Reducing Power Consumption, Ser. No. 10/313,275, filed Dec. 5, 2002 (referred to hereafter as "the '275 Application"), which shares a common assignee with the present application and which is incorporated, in its entirety, by reference herein.

BACKGROUND

1. Field of the Present Invention

The present invention generally relates to the field of data storage systems and more particularly to data storage systems that uses multiple disks.

2. History of Related Art

Data-centric services are becoming increasingly common in the field of data processing networks. Data-centric services, as their name implies, are data storage intensive services such as file servers, web applications, transaction processing systems, search engines, and data repositories. Whereas reliability and performance of such services have traditionally received extensive attention because of the enormous commercial implications of these services and their corresponding systems, energy consumption has received increased attention more recently. The cost of power delivery, the cost of cooling system components, and the impact of high operating temperatures on the stability and reliability of the components have all contributed to emphasize the importance of energy consumption in the implementation of data centric services.

As stated in Gurumurthi et al., *DRPM: Dynamic Speed Control for Power Management in Server Class Disks*, Proceedings of the International Symposium on Computer Architecture (ISCA) pp. 169–179 (June 2003), recent studies indicate that a data center can consume several megawatts of power, that the power density of data centers could soon exceed 100 Watts per square foot, and that data centers could collectively require 40 terawatt-hours (TWh) in 2005 at an expected cost exceeding four billion USD.

A considerable portion of the power consumed by server class systems is attributable to the disk subsystem and a considerable portion of the energy consumed by the disk subsystem is attributable to the spindle motors. Consequently, efforts to reduce energy consumption in disk-intensive environments have focused at least some attention on techniques for reducing the amount of time the disk subsystem spindle motors are active. In early attempts, reduced energy consumption was achieved by operating each disk as a quasi-binary state. Each disk was either fully one (i.e., spinning at its maximum RPM to achieve the greatest performance) or fully off (i.e., not spinning) to achieve maximum energy conservation. In Gurumurthi, this approach was identified as limited and a variable RPM approach was suggested. According to Gurumurthi, individual disks could spin at one of multiple RPM values intermediate between an off state (i.e., 0 RPM) and some maximum RPM condition. In this manner, Gurumurthi suggests that better energy consumption can be achieved if one recognizes that the intervals between disk access events may not be sufficient to warrant a complete spin down and that a spin down of a particular disk may be warranted under only certain conditions.

While Gurumurthi suggests the benefit of employing a variable RPM disk scheme on individual disks within a disk array, it does not describe a mechanism for considering the individual disks, and their corresponding RRMs as part of an integrated whole. Gurumurthi describes a system in which an individual disk is responsible for determining its own RPM based on its loading, etc. In such a scheme for example, the RPM of one disk is wholly independent of the RPM of associated disks. It would desirable to implement a system in which the RPMs of various disks in a disk array subsystem were coordinated to balance the objectives of performance and energy consumption of the disk subsystem as a whole.

SUMMARY OF THE INVENTION

The objective identified above is addressed by a data storage subsystem according to the present invention. The data storage subsystem includes a set of disks where each disk is operable in a plurality of discrete angular velocity levels. A disk controller controls the angular velocity of each active disk. The controller replicates a first portion of data on a plurality of the disks and stores a second class of data on the set of disks without replication. The disk controller routes data requests to one of the active disks based, at least in part, on the current loading of the active disks to maintain balanced loading on the active disks. The disk controller alters the angular velocity of at least one of the active disks upon detecting that the latency of one or more of the data requests differs from a specified threshold. In this manner, the disk controller maintains the angular velocity of the active disks at approximately the same minimum angular velocity needed to attain acceptable performance. The disk controller may replicate the first portion of data on each of the disks in the set of disks. The disk controller may balance the loading on the active disks by routing an incoming request to the active disk with the least loading. The disk controller may maintain each of the active disks at approximately the same angular velocity by preventing the angular velocity of any active disk from differing from the angular velocity of any other active disk by more than one discrete level. The disk controller may recognize two or more levels of request priorities. In this embodiment, the disk controller routes requests of a first priority to an active disk in a first subset of active disks based, at least in part, on the current loading of the disks in the first subset and routes requests of a second priority to an active disk in a second subset of active disks based, at least in part, on the current loading of the disks in the second subset.

BRIEF DESCRIPTION OF THE DRAWINGS

Other objects and advantages of the invention will become apparent upon reading the following detailed description and upon reference to the accompanying drawings in which:

FIG. 3 is a conceptual representation of data storage allocation on the data storage system of FIG. 1 according to one embodiment of the invention;

FIG. 4 and FIG. 5 illustrate exemplary data storage tables employed in one embodiment of the invention.

Figure 1:
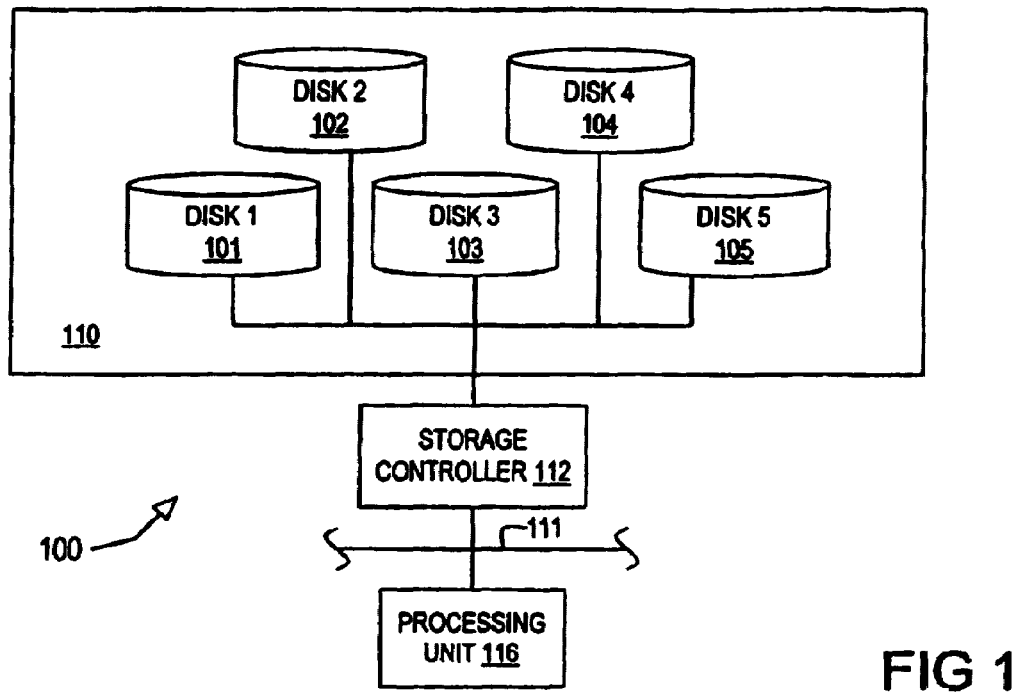
FIG. 1 is a block diagram of selected elements of a data storage system according to the present invention.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but to the contrary, the intention is to cover all modifications, equivalents, and alternatives falling within the spirit and scope of the present invention as defined by the appended claims.

DETAILED DESCRIPTION OF THE INVENTION

The present invention contemplates a system and method for reducing energy consumption in a server-class or other multiple-disk storage system that employs dynamic RPM disks (DRPM) and replication of popular data. A disk array controller considers not only the location of data in the disk array when servicing a request for popular data, but also the current workload of the disks in the array. The disk controller distributes request to the disks to balance the workload across the active disks in the array. The disk controller monitors the overall workload for the array and, based on this, selects an operating speed for all disk in the array. The chosen speed is the lowest possible speed that allows the array to maintain its performance criteria. By maintaining all active disks at (or close to) a common RPM that is the minimum RPM sufficient to maintain performance, the system minimizes energy consumption for any given level of performance requirements and loading.

Turning now to the drawings, FIG. 1 illustrates selected components of a data processing system 100 and its corresponding multiple-disk data storage system according to one embodiment of the invention. In the depicted embodiment, system 100 includes one or more processing units 116 (one of which is shown) coupled to a disk controller 112 through an interconnect 111. Processing unit 116 may be implemented with any of a wide variety of data processing systems typified by a microprocessor based computing system such as a network server, network computer, workstation, desktop computer, and the like. The interconnect 111 may be implemented with wire cabling such as in a conventional Ethernet or token ring network, optical fiber, or with wireless technology.

Disk controller 112 includes elements of a conventional RAID controller and is suitable for managing the storage of data on the array of disks referred to herein as disk subsystem 110. Accesses (reads and writes) of data to disk subsystem 110 initiated by any processing unit 116 are handled by controller 112. Thus, controller 112 determines, for example, the manner in which data redundancy and data striping are achieved. Disk controller 112 preferably maintains one or more data tables that facilitate the allocation of storage and the redundancy implementation. In the depicted embodiment, each of the disks 101 through 105 is capable of operating at multiple speeds, where a disk's speed is measured in terms of spindle motor's angular velocity (measure in revolutions per minute or RPMs). Disk controller 112 also controls the mechanical state of each of the disks 101 through 105 of disk subsystem 110, including the angular velocity of each disk. Disk controller 112 is configured to alter the angular velocity (RPM) of each disk 101 through 105 and, as such, is referred to herein as a Dynamic RPM or DRPM disk controller and disk subsystem 110 is referred to herein as a DRPM disk array. It will be appreciated that, although the depicted embodiment employs a disk array having five disks, the precise number of disks in disk subsystem 110 is an implementation specific detail that does not substantially alter novel components of disk controller 112.

Like the storage controller disclosed in the '275 Application, Disk controller 112 is preferably configured to implement a hybrid of conventional RAID redundancy schemes to achieve high performance (low access latency) while simultaneously minimizing energy consumption. In one embodiment, disk controller 112 is configured to determine a storage priority for each file or other portion of data. The storage priority is indicative of the corresponding data's popularity and stability. Data that is accessed frequently and rarely modified, is assigned a high storage priority, while data that is rarely accessed or frequently modified is assigned a lower storage priority. Frequently modified data may be given a lower storage priority because it is a less desirable candidate for replication. Specifically, if replication is implemented, at least in part, so that the spindle motors of at least some the disks can be turned off to save energy, frequently modified data may defeat the purpose of replication when the modified data must be written back to all of the disks containing a replicate of the data since writing data to a disk can only be achieved if the disk is active or spinning.

Disk controller 112 uses the storage priority factor to determine the storage organization to be used for the corresponding data. Data having the highest storage priority may be replicated on every disk 101 through 105 of disk subsystem 110 while data having a lowest storage priority may not be replicated at all, while still being protected from disk failures using RAID parity. Typically, all data in disk subsystem 110 will be stored in an organization that provides protection against data loss in the event of a disk crash. Thus, even data having the lowest storage priority would typically be stored with RAID parity such as in a RAID 4 or RAID 5 system (i.e., with the corresponding parity information being stored on a single disk or distributed across multiple disks).

Disk controller 112 may implement various levels of complexity in determining storage priorities. At one extreme, a "binary" storage priority is used to determine whether data is mirrored on multiple disks or not mirrored but protected with parity. In such a binary priority implementation, data having a first storage priority is stored on every disk 101 through 105 of disk subsystem 110 while data having a second storage priority is stored on a single disk (or possibly striped across multiple disks) without mirroring, but protected from failures using parity.

Figure 2:
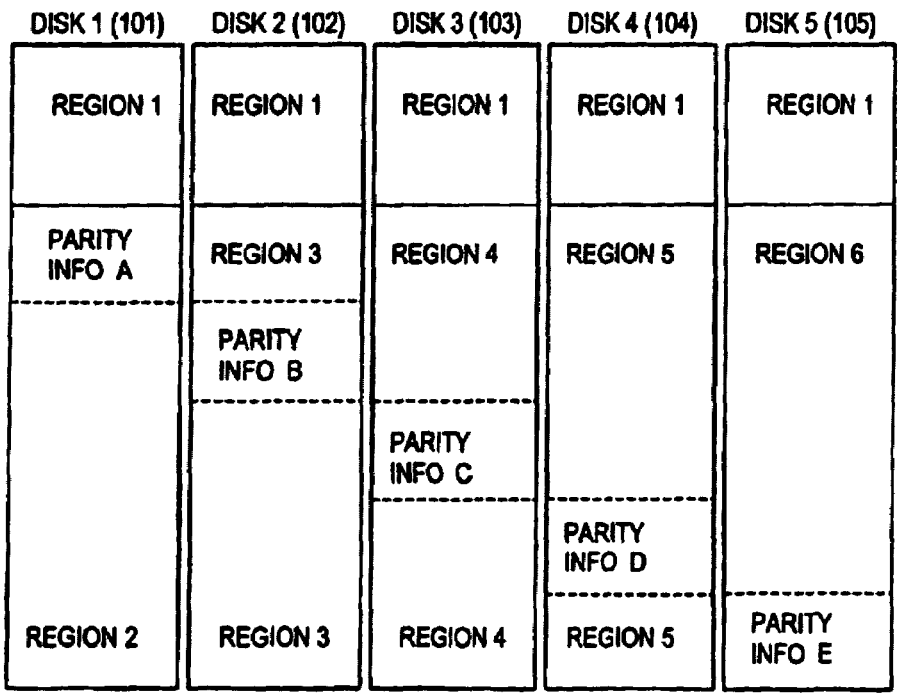
FIG. 2 is a conceptual representation of data storage allocation on the data storage system of FIG. 1 according to one embodiment of the invention.
Figures 3, 4:
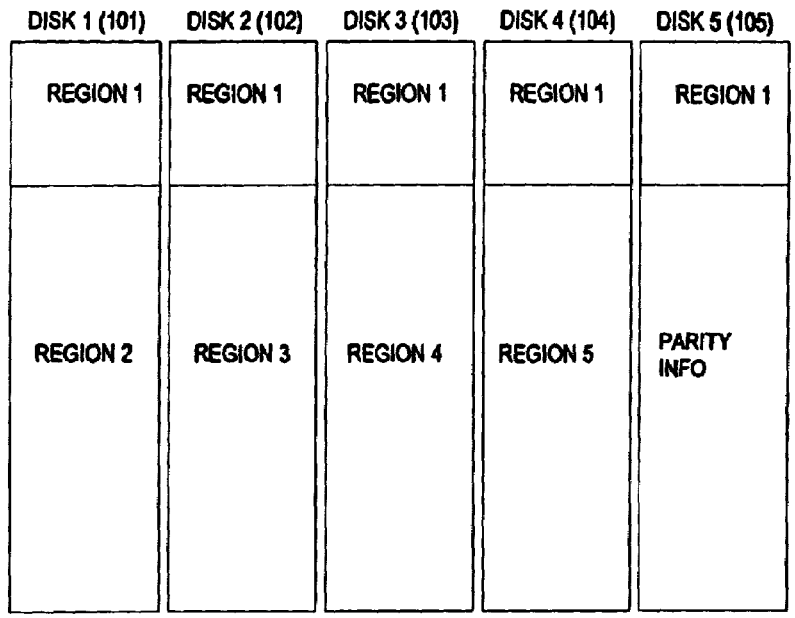

Turning now to FIGS. 2 and 3, conceptual representations of embodiments of the present invention employing hybrid RAID schemes to reduce disk storage power consumption are depicted. The implementations depicted in FIG. 2 and FIG. 3 represent embodiments in which the popular data represented by REGION 1 is replicated (as in RAID 1) on two or more disks 101 through 105 while the remaining data regions are maintained in a traditional RAID 5 (FIG. 2) or RAID 4 (FIG. 3) manner.

By replicating REGION 1 on multiple disks, the embodiments depicted in FIG. 2 and FIG. 3 beneficially require fewer power transitions of disks 101 through 105 because there is a higher probability that the disk most recently accessed includes the most popular data (REGION 1). In the depicted embodiments, for example, REGION 1 is replicated on every disk 101 through 105. This embodiment guarantees that the most recently accessed disk contains REGION 1.

In other embodiments, the number of disks on which REGION 1 is replicated may vary between 2 and N where N is the total number of disks in system 100 (e.g., five in the depicted examples). Controller 112 may choose the storage organization of REGION 1 based on its storage priority, which may be determined by analyzing historical data access patterns to determine the frequency with which files are accessed.

Disk controller 112 may maintain a storage table 170, as depicted in FIG. 4, that includes one or more entries 169. Each entry 169 corresponds to a file or data block maintained by system 100 and disk controller 112. In the depicted embodiment of table 170, each entry 169 includes file name information 171, file size information 172, sequential/random (S/R) indicator 173, disk information 174, location information 175, modification status information 176, least recently used information 177, priority information 178, and region location information 179. File name information 171 and file size information 172 identify the data by file name and indicate the size of the associated data. S/R indicator 173 indicates whether the corresponding entry is for data classified as part of a sequentially accessed file or a randomly accessed file. Disk information 174 indicates the disk or disks on which the data is currently stored. In the depicted illustration, the file "ABC" is popular data that is stored on disks 1, 2, 3, 4, and 5 while file "XYZ" is located on disk 2 exclusively.

Location information 175 indicates a storage location within the specified disk in the illustrated example, location information 175 includes a track (T) and sector (S) indicator, which are typical of disk storage systems. Modification status 176 indicates whether the data has been written recently and LRU information 177 indicates when a data block was last accessed.

The priority information 178 is indicative of how popular the file is (how frequently the data is accessed) and is used to determine the storage organization needed for a particular file. Region information 179 indicates the data region in which the data is stored. In this embodiment, data regions represent collections of data blocks. Although table 170 is illustrated as including the data shown for each file, it will be appreciated that additional or less information may be maintained for each file and that the data may be formatted differently than shown. In one embodiment, multiple tables similar to table 170 may be maintained by disk controller 112. As an example, controller 112 may maintain a table 170 for each region of data.

Disk controller 112 may also maintain a table 180, as depicted in FIG. 5, that provides a macroscopic view of the disks 101 through 105. In the depicted implementation, for example, table 180 indicates, for each disk, status information 181, capacity information 182, data allocation information 183 including the amount of storage allocated for data 184 and the amount of storage free for data allocation 185, parity allocation information 186 including the amount of storage allocated for parity 187 and the amount of storage free for parity allocation 188, RPM information 189 that indicates and controls the angular velocity of the corresponding disk, and loading information 190 that indicates the amount or volume of pending data requests currently allocated to the corresponding disk.

Using the information in table(s) 170 and 180, controller 112 may dynamically maintain the data contained in REGION 1 and the angular velocity of the active disks. If data not contained in REGION 1 is requested, controller 112 may move the requested data to REGION 1 using the information in tables 170 and 180 to determine whether any data currently residing in REGION 1 needs to moved elsewhere and, if so, which data should be moved. In one embodiment, the least recently used information 177 of table 170, which indicates when the most recent access to the corresponding data block was made, is used to prioritize the data that may be removed when capacity in REGION 1 is limited. Typically, the data that was least recently accessed is the first data to be moved elsewhere when new data is added to REGION 1. The size information 172 facilitates the determination of how many data blocks must be; removed when new data is added to REGION 1 (and capacity is constrained).

In an embodiment suitable for ease of implementation, two storage priority levels are used. Data with the first level of storage priority, typically including files that are not accessed frequently, are stored on a single disk and protected from disk failure via parity information stored on a separate disk. Data with the second level of storage priority, typically including frequently accessed files, are replicated on every disk 101 through 105. Embodiments of this type are illustrated in FIG. 2 and FIG. 3. Although FIG. 2 and FIG. 3 are substantially the same except for the parity implementation for the non-mirrored data (FIG. 2 uses RAID 5 parity while FIG. 3 uses RAID 4 parity), the embodiment depicted in FIG. 3 will be discussed in further detail because the RAID 4 implementation is consistent with the present invention's desire to minimize the number of active disks and active disk transitions. Because all parity is stored on a single disk (105 in the illustration) in a RAID 4 configuration, the RAID 4 implementation will generally require fewer disk transitions than a RAID 5, distributed parity scheme.

As depicted in FIG. 3, disks 101 through 105 contain five data regions (REGIONs 1–5) on disks 101 through 104 and a parity region on disk 105. Each of the disks 101 through 105 includes a copy of the most popular data, represented by REGION 1, that is replicated on each disk. The remainder of the capacity available on each disk 101 through 104 contains data that is not replicated. Thus, disk 101 includes a non-replicated data represented by REGION 2, disk 102 includes non-replicated data represented by REGION 3, and so forth. Redundancy is achieved using parity on disk 105 for non-replicated REGIONS 2 through 5. The parity information is typically calculated based upon the data in the remaining disks such that, if any one disk crashes, its data can be regenerated using the surviving disks. In an implementation that will be familiar to those skilled in the design of RAID systems, the parity information on disk 105 is the exclusive or (EXOR) product of the data on disks 101 through 104.

By replicating selected data (REGION 1 data) on multiple disks and using RAID 4 or RAID 5 redundancy on the remaining data, the embodiments of the invention depicted in FIG. 2 and FIG. 3 beneficially trade storage capacity, which is typically relatively cheap and prevalent, for reduced disk drive energy consumption. In a likely embodiment, two or more disks are in an active (spinning) state at any time, including one of the disks 101 through 104 and the parity disk 105. Because each data disk (disks 101 through 104) contains a copy of REGION 1, a single active data disk is sufficient to handle read accesses to REGION 1. If an access to a non-replicated data region that is not contained on the active disk occurs, disk controller 112 may spin down the currently active data disk and activate the disk containing the requested non-mirrored region. In this manner, it may be possible to reduce the number of active disks for a great majority of the operation and to incur an active disk transition (spinning up an idle disk and spinning down the currently active disk) only when non-mirrored data (not on the currently active disk) is accessed.

Disk controller 112 implements dynamic RPM (DRPM) control, in conjunction with the replication of popular data, to further reduce the amount of energy consumed by disk storage subsystem 110. Because popular data is replicated on multiple disks, most requests can be serviced by more than one disk. As such, disk controller 112 can select from among multiple disks to service most requests. In the present invention, disk controller 112 distributes requests to the active disks with the goal of maintaining the angular velocity of all active disks at or about the same value. Because requests for replicated data can be serviced by more than one active disk, disk controller 112 can direct requests to the disk that is best able to service the request at its current RPM.

In one embodiment, disk controller 112 minimizes disk subsystem energy consumption by maintaining each active (spinning) disk in disk subsystem 110 spinning at the lowest possible RPM that is consistent with system performance constraints. Still more specifically, disk controller 112 maintains each active disk in disk subsystem 110 spinning at (or close to) a selected RPM value such that the each active disk is spinning at (or close to) the same angular velocity. The DRPM disk subsystem 110 is typically capable of spinning each disk at one of several discrete RPM values or levels. In the context of this invention, two disks are spinning at "close" to the same values if they are spinning at adjacent RPM levels. If, for example, disks 101 through 105 are each capable of spinning at RPM values of 3000+N*600, where N is an integer between 0 and 15, two disks are spinning at close to the same value if their respective RPM values differ by 600 RPM.

A common RPM value for all active disks minimizes energy consumption for a given level of overall performance. Consider two identical disks X and Y. The power consumption for each of these disks is equal to $K\omega^2$ where K is a constant and $\omega$ is the disk's angular velocity (sometimes referred to herein as the disk's "speed") in RPM. The total power consumption P for this hypothetical 2-disk array is $K\omega_1^2$ to $K\omega_2^2$ where $\omega_1$ is the angular velocity of the first dis and $\omega_2$ is the angular velocity of the second disk. The average angular velocity $\Omega$ equals $(\omega_1+\omega_2)/2$ (i.e., $2\Omega=\omega_1+\omega_2$). For a given value of $\Omega$, the total power co expressed in terms of a single variable (either $\omega_1$ or $\omega_2$) as $P=K\omega_1^2+K(2\Omega-\omega_1)$ equation yields $P=K(2\omega_1^2-4\Omega\omega_1+4\Omega^2)$ and differentiating with respect to $\omega_1$ yield $dP/d\omega_1=4K\omega_1-4K\Omega$. Power is minimized when this derivative evaluates to zero, which occurs when $\omega_1=\Omega$. In other words, power consumption is minimized for any average value of disk speed when all disks are spinning at the same speed.

Figure 6:
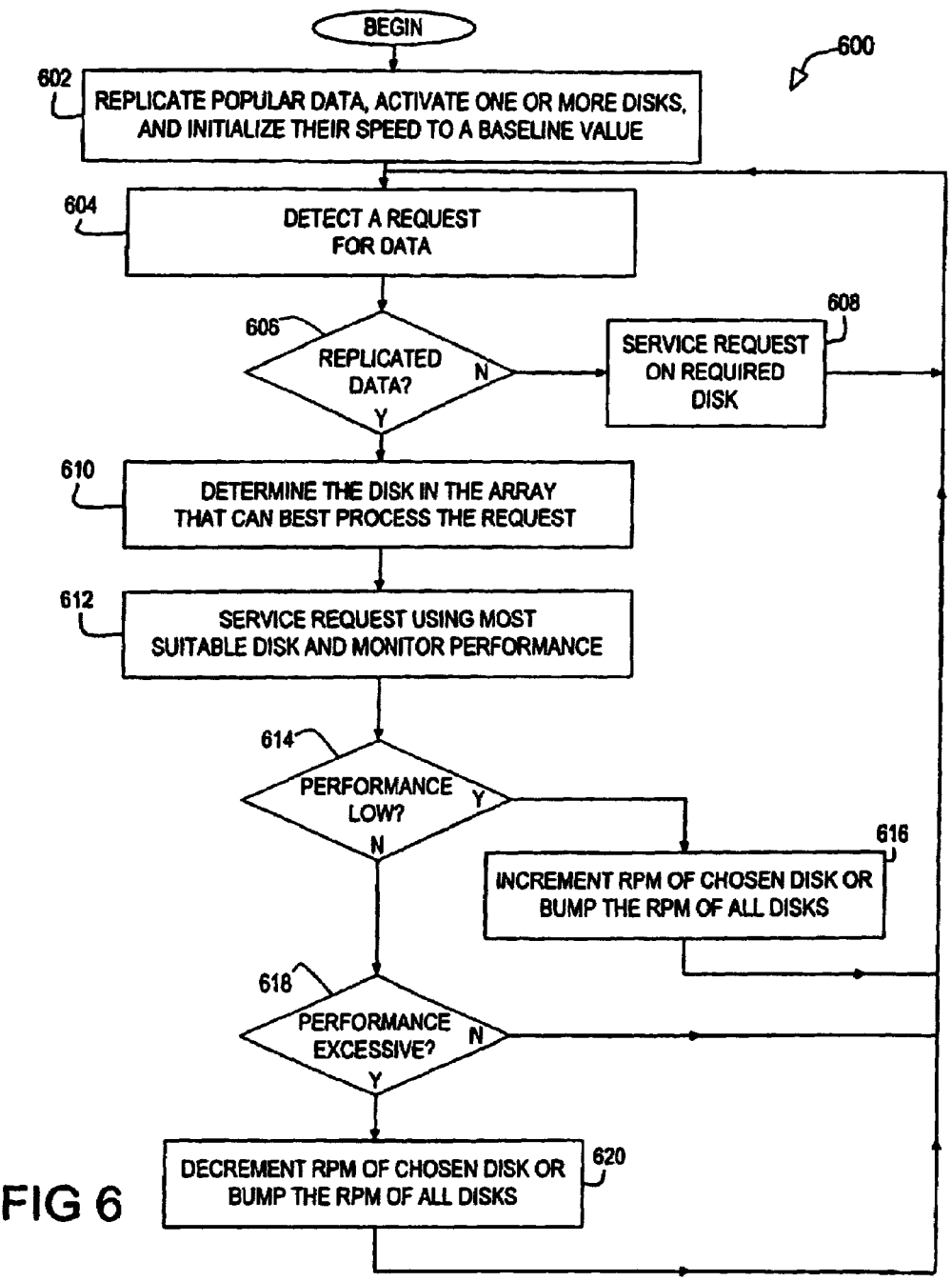
FIG. 6 illustrates a flow diagram for minimizing disk subsystem power consumption in a DRPM disk subsystem according to one embodiment of the invention.

Portions of the invention may be implemented as a set of computer executable instructions (computer software) for controlling a disk subsystem to minimize power consumption stored on a computer readable medium such as a hard disk, CD ROM, flash memory device, dynamic or static RAM, and the like. Referring to FIG. 6, a flow diagram illustrates a method 600 of minimizing disk subsystem power consumption in a DRPM disk subsystem is depicted.

The depicted embodiment of method 600 includes an initialization block 602 in which disk controller 112 activates one or more disks, replicates a first class of data (popular data) on multiple disks while storing a second class of data in non-replicated RAID fashion as described above with respect to FIGS. 2 and 3, and initializes the speed of the activated disks to a common, baseline value. In one embodiment, the initial baseline value is the lowest available RPM value for the corresponding disk(s) while, in another implementation, the baseline value may be an intermediate RPM value (i.e., an RPM value intermediate between the lowest and highest allowable RPM values). Whereas initializing the disks to the lowest possible speed may produce the greatest power consumption savings when the actual loading turns out to be low, the intermediate initial value case may reduce the amount of time transitioning disk speeds when the disk loading is greater. If the disk subsystem is implemented as depicted in FIG. 2 or 3, (i.e., with replication of the popular data on all disks), disk controller 112 may select any two or more of the disks to activate.

Once a set of disks have been activated and are spinning at a common speed, disk controller 112 monitors for incoming data requests. When a data request is detected (block 604), disk controller 112 may first determine (block 606) if the request is for data that is replicated in disk subsystem 110 (i.e., is the request a request for popular data). If the request is not for replicated data, disk controller 112 is constrained to service (block 608) the request using the particular disk where the requested data is currently stored, which may or may not include spinning up the disk if it is not currently activated. Presumably, however, a majority of requests are requests for data that is replicated. In such cases, disk controller 112 according to the present invention makes a determination (block 610) of which active disk can best service the request. Two varieties of this determination are described.

In a single priority implementation, all incoming requests are assumed to have the same priority. In this case, the disk that is best able to handle the request is the active disk that has the least loading. Referring back to table 180 of FIG. 5, disk controller 112 maintains loading information 190 for each disk in the array. Loading information 190 reflects the volume of data requests that are currently pending on each disk. Loading information 190 may, as an example, simply indicate the cumulative size (in bytes) of all pending requests for data on the corresponding disk. By distributing requests to the active disk that currently has the least loading, disk controller 112 maintains a balanced load on all active disks. The balanced loading that results enables disk controller 112 to maintain each disk at common speed and thereby minimize power consumption for the current level of performance and loading.

In a second implementation, disk controller 112 recognizes two (or more) levels of request priorities. In this case, disk controller 112 may reserve one or more disks as high priority disks. High priority requests can then be directed to the high priority disks preferentially while all other requests are routed to the remaining active disks. Assuming that high priority requests are rarer than other requests, high priority requests can be serviced more quickly on the high priority disk(s) without increasing the speed of the high priority disk(s). As a simplistic illustration, suppose disk controller 112 recognizes two priority levels. High priority requests are associated with a first acceptable latency while normal priority requests are associated with a second acceptable latency that is longer than the first latency. Disk controller 112 may reserve one or more active disks for servicing high priority requests and use one or more other active disks for servicing normal priority requests. High priority requests are then directed to the high priority disk(s) to maintain the requisite level of service for such requests at the current disk speed. In this case, disk controller 112 can still maintain all active disks at a common speed while also recognizing different priority levels. Once disk controller 112 has determined which disk will service a given request for data, disk controller then services (block 612) the request by routing the request to the selected disk.

Disk controller 112 monitors for acceptable performance by, for example, using conventional time stamping techniques to track the amount of time required to fulfill each request. Disk controller 112 maintains the angular velocity of each of the active disks at a minimum angular velocity required to attain an acceptable performance level (i.e., acceptable latency). Disk controller 112 may increase or decrease angular velocity of at least one of the active disks upon determining that data request latency differs from (i.e., is greater than or is less than) a specified threshold. If disk controller 112 detects (block 614) that the performance level of disk subsystem 110 has dropped below an acceptable threshold, disk controller 112 may then attempt to improve performance by increasing (block 616) the speeds of the active disks either by incrementing the speed of a chosen disk or incrementing the speed of all disks. Performance might also be improved by activating additional disks and disk controller 112 is preferably configured to evaluate the relative cost and benefit of activating an additional disk versus increasing the speed of the currently active disks. Specifically, disk controller 112 is configured to determine whether the goal of minimized power consumption is best served by increasing the speed of the currently active disks or by activating a previously inactive disk at the current speed.

In one embodiment, disk controller 112 first attempts to improve performance by ratcheting the speed of one of the active disks (e.g., the active disk that most recently exhibited unacceptable latency) to the next highest discrete speed level. Consistent with the desire to maintain all disks at a common speed, disk controller 112 may constrain the allowable deviation in disk speeds among the active disks to no more than one speed level (i.e., all active disk speeds are the same or, at most, one speed level different). In such cases, disk controller 112 may be prevented from incrementing the speed level of a particular disk (because it is already greater than the speed level of other active disks) and disk controller 112 may then increment the speed level of one or more of the other active disks.

By monitoring the performance of data requests, disk controller 112 may also recognize (block 618) conditions indicating that the current level of performance is unnecessarily high. This condition may be signaled, for example, if data requests are consistently being fulfilled with a latency that is significantly less than an acceptable latency or if a specified duration has elapsed since the most recent occurrence of an unacceptably high latency. If such conditions are recognized, disk controller 112 may attempt to improve energy consumption by lowering (block 620) the speed of one or more active disks (or by deactivating an active disk). Similar to the manner in which disk controller 112 is able to increase disk speed, disk controller 112 may be constrained from reducing the speed of a particular active disk when the disk's speed is already lower than the disk speed of one or more other disks. In such cases, disk controller 112 may lower the speed of all active disks that are currently at a higher speed level.

It will be apparent to those skilled in the art having the benefit of this disclosure that the present invention contemplates an energy conserving data storage system that uses dynamic RPM techniques in conjunction with data replication to minimize energy consumption for a given level of performance. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A data storage system, including
   a set of disks, each disk in the set of disks being operable in a plurality of discrete angular velocity levels;
   a disk controller enabled to control the angular velocity of each active disk in the set of disks and configured to replicate a first portion of data on a plurality of the set of disks and to store a second class of data in the set of disks without replication; and
   wherein the disk controller is configured to route requests for data in the first portion of data to one of the active disks based, at least in part, on the current loading of the active disks and wherein the disk controller is further configured to alter the angular velocity of at least one of the active disks responsive to determining that the latency associated with one or more of the data requests differs from a specified threshold.

2. The system of claim 1, wherein the disk controller is further configured to replicate the first portion of data on each of the disks in the set of disks.

3. The system of claim 1, wherein the disk controller balances the loading on the active disks by routing an incoming request to the active disk with the least loading.

4. The system of claim 3, wherein each of the disks is capable of rotating at any of a set of discrete angular velocity levels and wherein the disk controller prevents the angular velocity of any active disk from differing from the angular velocity of any other active disk by more than one discrete level.

5. The system of claim 4, wherein altering the angular velocity includes increasing the angular velocity of at least one of the active disks to the next highest discrete level if the latency is unacceptably high.

6. The system of claim 4, wherein altering the angular velocity of includes decreasing the angular velocity of at least one of the active disks to the next lowest discrete level if the latency is below a specified threshold.

7. The system of claim 1, wherein the disk controller recognizes two or more levels of request priorities and wherein the disk controller routes requests of a first priority to an active disk in a first subset of active disks based, at least in part, on to current loading of the disks in the first subset and the disk controller routes requests of a second priority to an active disk in a second subset of active disks based, at least in part, on the current loading of the disks in the second subset.

8. A disk controller computer program product including computer executable instructions, stored on a computer readable medium, for conserving power consumption in a dynamic RPM (DRPM) disk subsystem, comprising:
   disk controller computer code means for replicating a first portion of data on a plurality of the set of disks and for activating two or more of the disks;
   disk controller computer code means for storing a second class of data in the set of disks without replication; and
   disk controller code means far maintaining the angular velocity of each of the active disks at a minimum angular velocity sufficient to attain a specified performance level;

wherein the disk controller recognizes two or more levels of request priorities and further code means for routing requests of a first priority to an active disk in a first subset of active disks based, at least in part, on the current loading of the disks in the first subset and the disk controller routes requests of a second priority to an active disk in a second subset of active disks based, at least in part, on the current loading of the disks in the second subset.

9. The computer program product of claim 8, wherein the code means for replicate the first portion of data comprises code means for replicating the first portion of data on each of the disks in the set of disks.

10. The computer program product of claim 8, further comprising code means, responsive to a request for data on disk subsystem, for balancing the loading on the active disks by routing the request to the active disk with the least loading.

11. The computer program product of claim 10, wherein each of the disks is capable of rotating at any of a set of discrete angular velocity levels and wherein the computer program product further includes code means for preventing the angular velocity of any active disk from differing from the angular velocity of any other active disk by more than one discrete level whereby the angular velocities of all of the active disks are approximately equal.

12. The computer program product of claim 11, wherein altering the angular velocity includes increasing the angular velocity of at least one of the active disks if the latency is unacceptably high.

13. The computer program product of claim 11, wherein altering the angular velocity includes decreasing the angular velocity of at least one of the active disks if the latency is below a specified threshold.

14. A method for conserving power consumption in a dynamic RPM (DRPM) disk subsystem, comprising:
replicating a first portion of data on a plurality of the set of disks;
storing a second class of data in the set of disks without replication;
activating two or more of the set of disks;
maintaining the angular velocity of each of the active disks at a minimum angular velocity sufficient to attain a specified performance level; and
responsive to a request for data on disk subsystem, balancing the loading on the active disks by routing the request to the active disk with the least loading;
wherein each of the disks is capable of rotating at any of a set of discrete angular velocity levels and wherein the method further includes preventing the angular velocity of any active disk from differing from the angular velocity of any other active disk by more than one discrete level whereby the angular velocities of all or the active disks are approximately equal; and
wherein altering the angular velocity includes increasing the angular velocity of at least one of the active disks if the latency is unacceptably high.

15. The method of claim 14, wherein replicating the first portion of data comprises replicating the first portion of data on each of the disks in the set of disks.

16. The method of claim 14, wherein altering the angular velocity of includes decreasing the angular velocity of at least one of the active disks if the latency is below a specified threshold.

17. The method of claim 14, wherein the disk controller recognizes two or more levels of request priorities and further code means for routing requests of a first priority to an active disk in a first subset of active disks based, at least in part, on the current loading of the disks in the first subset and the disk controller routes requests of a second priority to an active disk in a second subset of active disks based, at least in part, on the current loading of the disks in the second subset.

* * * * *